UNITED STATES PATENT OFFICE.

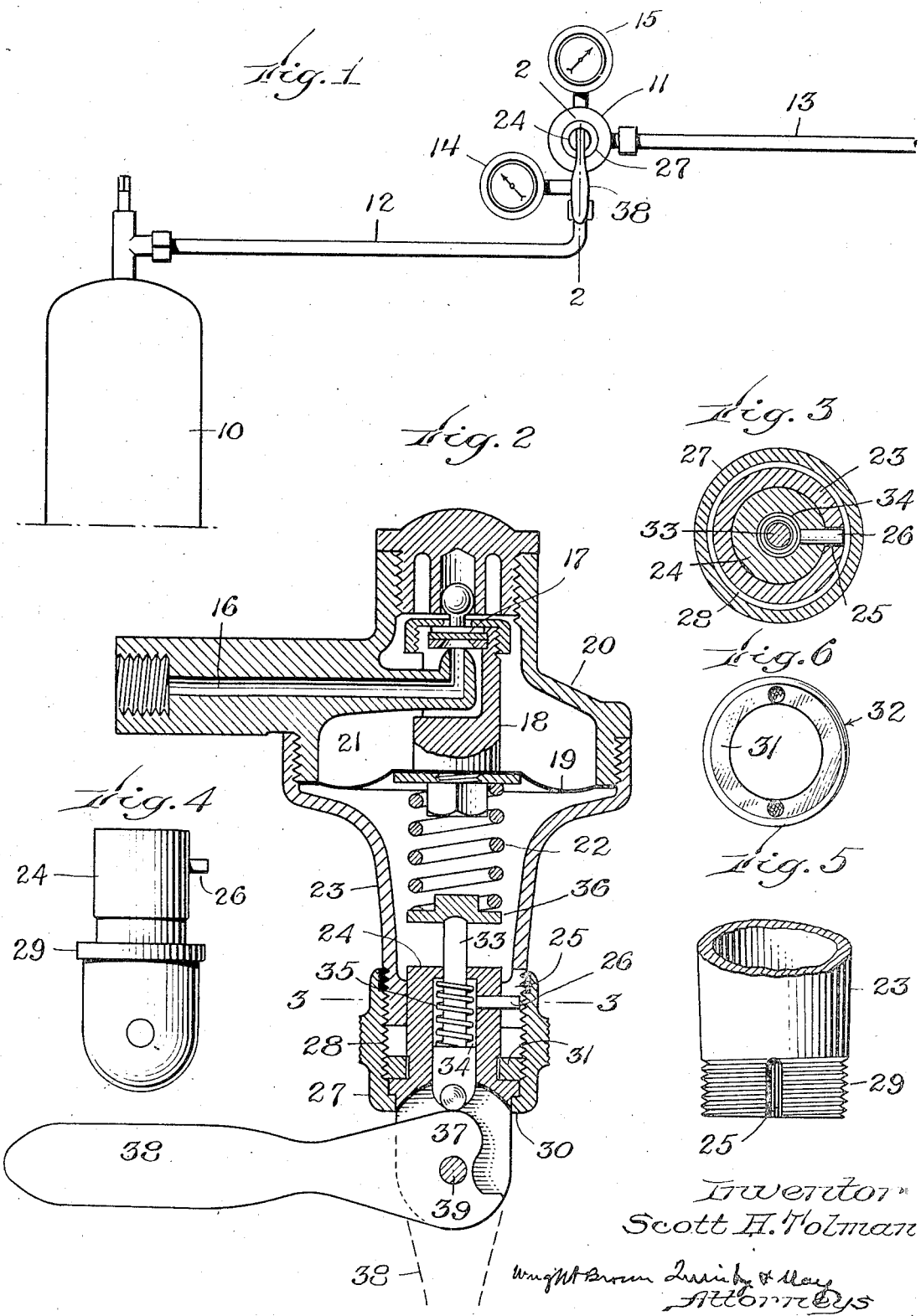

SCOTT H. TOLMAN, OF BOSTON, MASSACHUSETTS.

SPRING-ADJUSTING DEVICE.

1,324,084. Specification of Letters Patent. Patented Dec. 9, 1919.

Application filed September 26, 1917, Serial No. 193,324. Renewed September 19, 1919. Serial No. 325,035.

*To all whom it may concern:*

Be it known that I, SCOTT H. TOLMAN, a citizen of the United States, residing at Boston, in the county of Suffolk and State of Massachusetts, have invented new and useful Improvements in Spring-Adjusting Devices, of which the following is a specification.

The object of the present invention is to provide an improved spring-adjusting device for service similar to that of the spring-adjusting device shown and described in my copending application filed July 17, 1917, Serial No. 181,669.

According to the present improvement, the spring-adjusting plug is not a screw plug and is locked against rotative movement, but is nevertheless movable endwise to vary the applied force of the spring to the desired degree. The plug is adjusted endwise by a nut, with which it has swivel connection, the nut alone being the rotatable element. The operating handle is carried by the plug, but is not capable of turning about the axis of the latter, as in my other device above mentioned, because in the present device the plug is locked against rotative movement.

I gain several advantages by my present improvement, the principal ones of which it may be well to explain.

First. The operating handle has a uniform direction of movement with all adjustments, due to the fact that it never turns about the axis of the plug. The condition obviates confusion on the part of the user when about to throw the handle from the high-pressure position to the low-pressure position, and vice versa.

Second. The primary adjustment cannot be disturbed by any stress applied to the handle and is not liable to be disturbed otherwise.

Third. The primary adjustment may be obtained more quickly and more easily. This is due to the fact that the rotatable adjusting element is never clamped, or otherwise fastened, and is always free to be turned for the purpose.

Of the accompanying drawings, which illustrate what I now consider the preferred form of the invention,—

Figure 1 is an elevation, on a relatively small scale, of fluid-feeding apparatus including my improved regulating device applied to a pressure-reducing valve, and a supply tank for fluid under pressure.

Fig. 2 is a sectional view through the structure intersected by line 2—2 of Fig. 1, the sectional view being turned to a position similar to that of the corresponding view in my aforesaid earlier application.

Fig. 3 is a cross section through the structure intersected by line 3—3 of Fig. 2.

Fig. 4 is an elevation of the adjustable plug.

Fig. 5 is an elevation of the slotted and threaded portion of the fixture in which the plug fits.

Fig. 6 is an end view of a retaining ring that forms swivel connection between the plug and the adjusting collar.

The same reference characters indicate the same parts wherever they occur.

Although the device is adapted to be used in combination with various other devices, I have shown it in combination with a pressure-reducing valve of the style that is commonly used for regulating the flow of gas from a pressure tank to the point of use, as, for instance, to a welding torch. Having shown a specific adaptation of the device, it may be well to preface the essential features of the invention with a general description of the apparatus in which it is included.

A tank for gas under pressure is indicated at 10, and a pressure-reducing valve is indicated as a whole at 11. The gas is conducted from the tank, under relatively high pressure, to the reducing valve 11, by pipe 12, and is conducted under reduced pressure from valve 11 by a pipe 13. A pressure gage 14 is arranged to indicate the pressure on the supply side of the reducing valve, and a pressure gage 15 is arranged to indicate the working pressure, that is, the pressure on the delivery side of the reducing valve.

The supply from tank 10 enters the casing of the reducing valve 11 through a passageway 16 formed in the latter. The delivery end of this passageway is controlled by a fluid-pressure-operated valve 17, which is carried by a stud 18. This stud is carried by a pressure-operated diaphragm 19, the latter coöperating with the part 20 of the valve casing to form a pressure chamber 21. The supply of gas is thus admitted to chamber 21 under the control of valve 17, and is conducted from said chamber by pipe 13, the fluid pressure in said chamber acting upon diaphragm 19 in a direction that tends to seat valve 17.

The seating tendency of the valve is counteracted by a spring 22, and the degree of fluid pressure at which the valve 17 will seat depends upon the degree of applied stress of spring 22. The purpose of the present invention is to provide improved means for regulating the degree of applied stress of this spring, and I will now proceed to describe such means.

The spring 22 is inclosed within an annular fixture or holder 23, which, in the present instance, is in the form of a bonnet and is screwed to the part 20 of the valve casing. A plug 24 is arranged in the mouth of the holder 23 and is capable of sliding endwise therein, the internal surface of the mouth and the external surface of the plug conforming to each other and fitting closely enough to prevent undue motion, but at the same time permitting free endwise motion of the plug. For the purposes of the present invention, the plug is prevented from turning about its axis relatively to the holder 23, and, while any suitable means may be provided for this purpose, I prefer to form a slot 25 in the holder, and to provide the plug with a pin 26 adapted to move in the slot. The endwise movement of the plug is caused, in the present instance, by a screw-threaded collar 27, the screw thread 28 of which coacts with a screw thread 29 formed upon the holder. For convenience in assembling and taking apart the structure, I lock the plug and the collar to each other so that they will not be likely to become separated from each other even though separated from the holder 23. Such locking, however, does not prevent the collar from rotating relatively to the plug, and the locking connection is therefore of the swivel type. For this purpose the plug is provided with an external flange 29, and the collar is provided with an internal flange 30, the shoulders provided by said flanges being arranged to lap one over the other, as shown by Fig. 2. The plug is confined in the collar by a screw ring 31, the screw thread 32 of which coöperates with the thread 28 of the collar. Flange 29 of the plug is thus confined between flange 30 of the collar and screw ring 31, but the ring is not screwed in so far as to bind flange 29. By screwing the collar in one direction or the other upon the holder 23, plug 24 will be advanced or retracted as the case may be, but the plug will not partake of the rotative movement of the collar. This movement of the plug is utilized to obtain the primary adjustment of spring 22, which adjustment will be more clearly understood when the remaining elements of the structure have been described.

Plug 24 carries a plunger 33, being provided with a socket 34 for the reception of said plunger and for the reception of a helical compression spring 35. The plunger extends through the inner end of the plug, and is provided with a swivel head 36 upon which one end of the spring 22 is seated. Plunger 33 is capable of being moved endwise relatively to plug 24, and for this purpose the device is provided with a cam member 37. This member is provided with an operating handle 38, and is carried by plug 24 through the medium of a connecting pivot stud 39. The cam member is so formed that 90° motion will advance the plunger from its fully retracted position to its fully advanced position. The latter position is shown by the drawing, spring 22 being consequently under a relatively high degree of stress as when the valve is in use.

It is observed that plunger 33 is capable of moving to vary the applied stress of spring 22, without requiring any movement of plug 24. On the other hand, plug 24 is capable of being moved endwise by turning collar 27, thus varying the applied stress of the spring without swinging cam 37 about its pivot stud 39. The latter process is the one for obtaining the primary adjustment of the spring, while the independent movement of plunger 33 is the one that would occur repeatedly after the primary adjustment had once been determined.

It is to be observed that pivot stud 39 cannot turn about the axis of plug 24, and, consequently, in all positions of adjustment, primary or otherwise, the operating handle 38 will always have the same direction of motion for accomplishing the same result, the device differing in this respect from that shown in my aforesaid earlier application, and being an improvement because it avoids confusion on the part of the user as to whether the handle should be thrown in one direction or another. This advantage of the present device is an important one because when the device is used in combination with a welding torch, and in combination with other devices, it is extremely important for the user to know at all times which way to throw the operating handle to obtain the desired effect, without being obliged to take into account some varying condition.

Having thus explained the nature of my said invention and described a way of making and using the same, although without attempting to set forth all of the forms in which it may be made or all of the modes of its use, what I claim is:

1. A device of the character described, comprising an annular holder, a spring arranged therein, a plug arranged to slide endwise in the mouth of said holder, a plunger arranged to slide endwise of said plug in coaxial relation thereto, said plunger being arranged to bear against said spring to vary the applied force of the latter, manually operative means carried by said plug and arranged to move said plunger endwise, means arranged to hold said plug against turning about its axis relatively to said holder, a collar surrounding said plug, said holder and said collar having coactive screw threads arranged to cause endwise movement of said collar as the latter is turned, and means arranged to transmit endwise movement of said collar to said plug to vary the applied force of the spring as the collar is turned.

2. A device of the character described, comprising an annular holder, a spring arranged therein, a plug arranged to slide endwise in the mouth of said holder, a plunger arranged to slide endwise in said plug in coaxial relation thereto, said plunger being arranged to bear against said spring to vary the applied force of the latter, manually operative means carried by said plug and arranged to move said plunger endwise, and a collar surrounding said plug, said holder and said collar having coactive screw threads arranged to cause endwise movement of the collar as the latter is turned, said collar and said plug having coöperative, relatively rotatable, shoulders arranged to sustain the stress of said spring.

3. A device of the character described, comprising an annular holder, a spring arranged therein, a plug arranged to slide endwise in the mouth of said holder, a plunger arranged to slide endwise in said plug in coaxial relation thereto, said plunger being arranged to bear against said spring to vary the applied force of the latter, manually operative means carried by said plug and arranged to move said plunger endwise, means arranged to hold said plug against turning about its axis relatively to said holder, a collar surrounding said plug, said holder and said collar having coactive screw threads arranged to cause endwise movement of said collar as the latter is turned, said collar and said plug having coöperative, relatively rotatable, shoulders arranged to sustain the stress of said spring, and a ring secured to and within said collar to maintain the assembled relation of the plug and collar.

In testimony whereof I have affixed my signature.

SCOTT H. TOLMAN.